(12) United States Patent
Oda et al.

(10) Patent No.: US 9,724,740 B2
(45) Date of Patent: Aug. 8, 2017

(54) CENTRIFUGALLY CAST COMPOSITE ROLL AND ITS PRODUCTION METHOD

(71) Applicant: HITACHI METALS, LTD., Tokyo (JP)

(72) Inventors: Nozomu Oda, Kitakyusyu (JP); Takayuki Segawa, Kitakyusyu (JP); Yasunori Nozaki, Kitakyusyu (JP); Toshiyuki Hattori, Kitakyusyu (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/911,947

(22) PCT Filed: Aug. 28, 2014

(86) PCT No.: PCT/JP2014/072584
§ 371 (c)(1),
(2) Date: Feb. 12, 2016

(87) PCT Pub. No.: WO2015/045720
PCT Pub. Date: Apr. 2, 2015

(65) Prior Publication Data
US 2016/0193637 A1    Jul. 7, 2016

(30) Foreign Application Priority Data
Sep. 25, 2013    (JP) ................. 2013-198950

(51) Int. Cl.
*B21B 27/03*    (2006.01)
*B21B 27/02*    (2006.01)
(Continued)

(52) U.S. Cl.
CPC ............. *B21B 27/02* (2013.01); *B21B 27/032* (2013.01); *B22D 13/02* (2013.01); *B22D 13/026* (2013.01);
(Continued)

(58) Field of Classification Search
CPC ....... B21B 27/02; B21B 27/021; B21B 27/03; B21B 27/032; B22D 13/026; B22D 19/16;
(Continued)

(56) References Cited

U.S. PATENT DOCUMENTS 3,659,323 A * 5/1972 Hachisu ................ B22D 19/16
164/76.1
3,754,593 A * 8/1973 Stone ..................... B22D 19/16
164/115
(Continued)

FOREIGN PATENT DOCUMENTS

CN    101041165 A    9/2007
CN    101406900 A    4/2009
(Continued)

OTHER PUBLICATIONS

International Search Report of PCT/JP2014/072584 dated Nov. 18, 2014.
(Continued)

*Primary Examiner* — Edward Tolan
(74) *Attorney, Agent, or Firm* — Sughrue Mion, PLLC

(57) ABSTRACT

A centrifugally cast composite roll comprising an outer layer formed by a centrifugal casting method, and an inner layer made of ductile cast iron and integrally fused to the outer layer, the outer layer being made of an Fe-based alloy comprising by mass 1.3-3.7% of C, 0.3-3% of Si, 0.1-3% of Mn, 1-7% of Cr, 1-8% of Mo, at least one of 2.5-7% of V, 0.1-3% of Nb and 0.1-5% of W (V is indispensable), and 0.01-0.2% of B and/or 0.05-0.3% of S, the balance being substantially Fe and inevitable impurities, the outer layer having a structure containing no graphite; the inner layer comprising a core portion fused to the outer layer, and a drive-side shaft portion and a free-side shaft portion integrally extending from both ends of the core portion; the total
(Continued)

amount of Cr, Mo, V, Nb and W being 0.35-2% by mass in an end portion of the drive-side shaft portion and 0.15-1.8% by mass in an end portion of the free-side shaft portion, the former being larger than the latter by 0.2% or more by mass.

7 Claims, 3 Drawing Sheets

(51) Int. Cl.
| | | |
|---|---|---|
| B22D 13/02 | (2006.01) | |
| C22C 37/00 | (2006.01) | |
| B22D 19/16 | (2006.01) | |
| B32B 15/01 | (2006.01) | |
| C22C 37/06 | (2006.01) | |
| C22C 37/08 | (2006.01) | |
| C22C 37/10 | (2006.01) | |
| C22C 38/02 | (2006.01) | |
| C22C 38/04 | (2006.01) | |
| C22C 38/22 | (2006.01) | |
| C22C 38/24 | (2006.01) | |
| C22C 38/26 | (2006.01) | |
| C22C 38/32 | (2006.01) | |
| C22C 38/38 | (2006.01) | |
| C22C 38/44 | (2006.01) | |
| C22C 38/46 | (2006.01) | |
| C22C 38/48 | (2006.01) | |
| C22C 38/54 | (2006.01) | |
| C22C 38/56 | (2006.01) | |
| C22C 38/60 | (2006.01) | |

(52) U.S. Cl.
CPC ............ *B22D 19/16* (2013.01); *B32B 15/011* (2013.01); *C22C 37/00* (2013.01); *C22C 37/06* (2013.01); *C22C 37/08* (2013.01); *C22C 37/10* (2013.01); *C22C 38/02* (2013.01); *C22C 38/04* (2013.01); *C22C 38/22* (2013.01); *C22C 38/24* (2013.01); *C22C 38/26* (2013.01); *C22C 38/32* (2013.01); *C22C 38/38* (2013.01); *C22C 38/44* (2013.01); *C22C 38/46* (2013.01); *C22C 38/48* (2013.01); *C22C 38/54* (2013.01); *C22C 38/56* (2013.01); *C22C 38/60* (2013.01)

(58) Field of Classification Search
CPC ......... C22C 37/06; C22C 38/18; C22C 38/22; C22C 38/24; C22C 38/36
See application file for complete search history.

(56) References Cited

U.S. PATENT DOCUMENTS

| | | | | |
|---|---|---|---|---|
| 5,305,522 | A | * | 4/1994 | Nawata ................ B21B 27/00 29/895.32 |
| 5,355,932 | A | * | 10/1994 | Nawata ................ B21B 27/00 164/114 |
| 9,044,807 | B2 | * | 6/2015 | Oda ..................... B21B 27/032 |
| 2008/0226936 | A1 | * | 9/2008 | Furushima ............ B21B 27/00 428/615 |
| 2014/0377587 | A1 | | 12/2014 | Oda et al. |

FOREIGN PATENT DOCUMENTS

| | | | |
|---|---|---|---|
| EP | 0464780 A1 | 1/1992 | |
| EP | 2740552 A1 | 6/2014 | |
| JP | 5-5155 A * | 1/1993 | ............ C22C 37/06 |
| JP | 06-304612 A | 11/1994 | |
| JP | 08-117965 A | 5/1996 | |
| JP | 2000-160277 A | 6/2000 | |
| JP | 2000-178675 A | 6/2000 | |
| JP | 2006-281301 A | 10/2006 | |
| JP | 2007-245217 A | 9/2007 | |
| JP | 2012-213780 A | 11/2012 | |

OTHER PUBLICATIONS

Communication dated Feb. 3, 2017, from the State Intellectual Property Office of People's Republic of China in corresponding Application No. 201480052105.X.

Communication dated Apr. 21, 2017, issued from the European Patent Office in counterpart European Patent Application No. 14849491.7.

* cited by examiner

CENTRIFUGALLY CAST COMPOSITE ROLL AND ITS PRODUCTION METHOD

CROSS REFERENCE TO RELATED APPLICATIONS

This is a National Stage of International Application No. PCT/JP2014/072584 filed Aug. 28, 2014 (claiming priority based on Japanese Patent Application No. 2013-198950 filed Sep. 25, 2013), the contents of which are incorporated herein by reference in their entirety.

FIELD OF THE INVENTION

The present invention relates to a centrifugally cast composite roll having a composite structure comprising a centrifugally cast outer layer having excellent wear resistance and failure resistance, and a tough inner layer integrally fused to the outer layer, and its production method.

BACKGROUND OF THE INVENTION

As a working roll for hot rolling, a centrifugally cast composite roll comprising a centrifugal cast outer layer made of a wear-resistant iron-based alloy, and an inner layer made of tough ductile cast iron and integrally fused to the outer layer is widely used. Because the outer layer of the centrifugally cast composite roll is subjected to a thermal and mechanical load by contact with a strip to be rolled, its surface suffers damages such as wearing, roughening, etc., damaging the surface quality of a rolled strip. Accordingly, when the outer layer suffers damages to some extent, the roll is exchanged. After damaged portions are removed by machining from an outer layer of a roll taken out of a mill, the roll is assembled again in the mill. The removal of damages from an outer layer of a roll is called "damage-removing cutting." The working roll is discarded, after it is cut to remove damages from the initial diameter to the minimum diameter usable for rolling (discard diameter). A diameter in a range from the initial diameter to the discard diameter is called "an effective rolling diameter." Because frequent damage-removing cutting lowers productivity by the interruption of rolling, an outer layer in an effective rolling diameter desirably has excellent wear resistance, failure resistance and surface roughening resistance to avoid large damages.

As shown in FIG. 1, a composite roll 10 comprises an outer layer 1 coming into contact with a strip to be rolled, and an inner layer 2 fused to an inner surface of the outer layer 1. The inner layer 2 is made of a material different from that of the outer layer 1, and constituted by a core portion 21 fused to the outer layer 1, and a drive-side shaft portion 22 and a free-side shaft portion 23 integrally extending from both sides of the core portion 21. An end portion of the drive-side shaft portion 22 is integrally provided with a clutch portion 24 for transmitting a driving torque. An end portion of the free-side shaft portion 23 is integrally provided with a projection 25 necessary for handling the composite roll 10. The clutch portion 24 has an end surface 24a, and a pair of flat notch surfaces 24b, 24b engageable with a driving means (not shown). The projection 25 has an end surface 25a. The drive-side shaft portion 22 and the free-side shaft portion 23 should be machined to form bearing portions, neck portions, etc.

When the composite roll 10 is used for hot rolling, damages such as wearing, seizure, surface roughening, etc. should be suppressed in the outer layer 1, and wearing should also be suppressed in the clutch portion 24 of the drive-side shaft portion 22 connected to a coupling means for torque transmission, to expand damage-removing cutting intervals as much as possible. To this end, it is important that the outer layer 1 is made of an iron-based alloy having excellent wear resistance and failure resistance, and that the inner layer 2 is made of ductile cast iron having improved wear resistance.

As a hot-rolling composite roll having a clutch portion with improved wear resistance, JP 6-304612 A discloses a hot-rolling composite roll comprising an outer layer made of high-speed tool steel, an inner layer and shaft portions both made of carbon steel or low-alloy steel containing 0.2-1.2% by weight of C, and a clutch portion connected to an end of a shaft portion by casting, the clutch portion being made of spheroidal graphite cast iron comprising by weight 2.5-3.5% of C, 1.6-2.8% of Si, 0.3-0.6% of Mn, less than 0.05% of P, less than 0.03% of S, less than 0.5% of Ni, less than 0.2% of Cr, less than 0.5% of Mo, and 0.02-0.05% of Mg, the balance being Fe and other inevitable components, in which an area ratio of graphite is 5-15%. However, this clutch portion has still insufficient wear resistance. Because the clutch portion is connected to an end of the shaft portion, their connection interface likely suffers casting defects such as foreign matter contained, etc. Further, it suffers a high production cost, because it needs machining a connected-by-casting portion flatly, using a mold surrounding a portion to be connected by casting, and casting spheroidal graphite cast iron for the clutch portion different from the inner layer.

JP 2012-213780 A discloses a rolling composite roll comprising an outer layer, a core portion formed inside the outer layer, a drive-side shaft portion extending from one end of the core portion, and a free-side shaft portion extending from another end of the core portion, the drive-side shaft portion having higher tensile strength than that of the free-side shaft portion by 50 MPa or more. As a method for providing different tensile strength to the drive-side shaft portion and the free-side shaft portion, JP 2012-213780 A describes a stationary casting method with a drive-side shaft portion on the lower side and a free-side shaft portion on the upper side, using a die coated with a refractory material for a lower mold for the drive-side shaft portion, and a sand mold for an upper mold for the free-side shaft portion, the casting temperature being lower in the lower mold than in the upper mold by 20° C. or more. However, even though the casting temperature difference can make the drive-side shaft portion stronger than the free-side shaft portion, it fails to provide the drive-side shaft portion higher wear resistance than that of the free-side shaft portion.

In addition, if the entire inner layer 1 were made harder to provide the drive-side shaft portion 22 with increased wear loss resistance, the free-side shaft portion 23 would also become harder, resulting in lower machinability.

OBJECT OF THE INVENTION

Accordingly, an object of the present invention is to provide a centrifugally cast composite roll having a drive-side shaft portion provided with improved wear loss resistance while keeping the machinability of a free-side shaft portion, and its production method.

DISCLOSURE OF THE INVENTION

As a result of intensive research in view of the above object, the inventors have found that when the elevating speed of a surface of an inner layer melt poured into a stationary casting mold is properly controlled after an outer layer is formed by a centrifugal casting method, (a) Cr, Mo, V, Nb and W in an outer layer can be introduced more into a drive-side shaft portion than into a free-side shaft portion, thereby making the drive-side shaft portion harder than the free-side shaft portion, (b) thereby providing excellent wear loss resistance to the high-hardness drive-side shaft portion, and good machinability to the free-side shaft portion. The present invention has been completed based on such finding.

Thus, the centrifugally cast composite roll of the present invention comprises an outer layer formed by a centrifugal casting method, and an inner layer made of ductile cast iron and integrally fused to the outer layer;

the outer layer being made of an Fe-based alloy comprising by mass 1.3-3.7% of C, 0.3-3% of Si, 0.1-3% of Mn, 1-7% of Cr, 1-8% of Mo, at least one element selected from the group consisting of 2.5-7% of V, 0.1-3% of Nb and 0.1-5% of W, V being indispensable, and 0.01-0.2% of B and/or 0.05-0.3% of S, the balance being substantially Fe and inevitable impurities, the outer layer having a structure containing no graphite;

the inner layer comprising a core portion fused to the outer layer, and a drive-side shaft portion and a free-side shaft portion integrally extending from both ends of the core portion; and the total amount of Cr, Mo, V, Nb and W in an end portion of the drive-side shaft portion being 0.35-2% by mass, and the total amount of Cr, Mo, V, Nb and W in an end portion of the free-side shaft portion being 0.15-1.8% by mass, the former being larger than the latter by 0.2% or more by mass.

The outer layer may further comprise at least one selected from the group consisting of 0.1-5% of Ni, 0.1-10% of Co, 0.01-0.5% of Zr, 0.005-0.5% of Ti, and 0.001-0.5% of Al by mass.

The method of the present invention for producing a centrifugally cast composite roll comprises the steps of (1) centrifugally casting the outer layer in a rotating cylindrical centrifugal casting mold;

(2) erecting the cylindrical casting mold having the outer layer, and disposing a lower mold for the drive-side shaft portion and an upper mold for the free-side shaft portion both communicating with the outer layer, on upper and lower ends of the cylindrical casting mold, to constitute a stationary casting mold; and (3) pouring a melt for the inner layer into a cavity constituted by the upper mold, the outer layer and the lower mold;

the elevating speed of a melt surface in the upper mold being 100 mm/second or less, and smaller than the elevating speed of a melt surface in the lower mold and the outer layer.

The elevating speed difference between a melt surface in the upper mold and a melt surface in the lower mold and the outer layer is preferably 50-150 mm/second.

DESCRIPTION OF THE PREFERRED EMBODIMENTS

Figure 1:
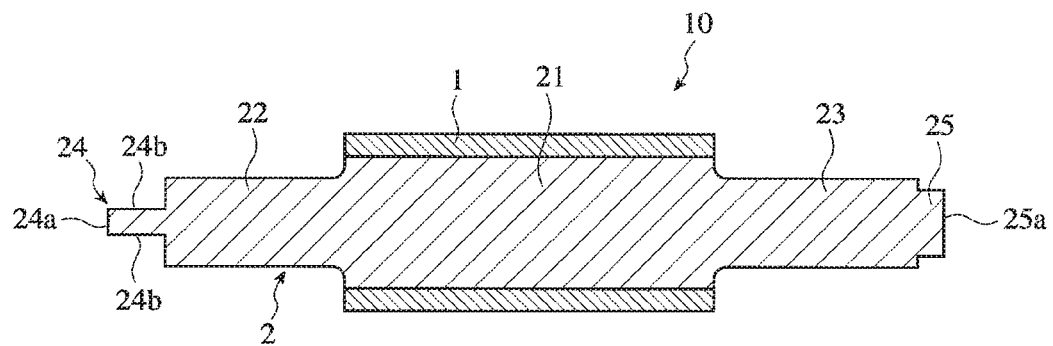
FIG. 1 is a schematic cross-sectional view showing a composite roll.
Figure 2:
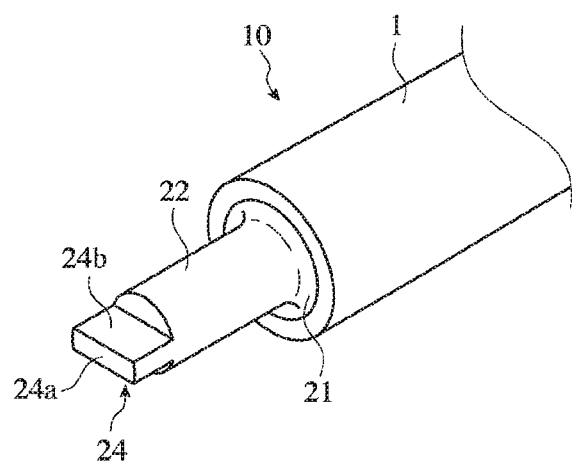
FIG. 2 is a perspective view showing part of the composite roll of FIG. 1 on the clutch portion side.

The embodiments of the present invention will be explained in detail below without intention of restriction, and various modifications may be made within the scope of the present invention. Unless otherwise mentioned, the term "%" simply described means "% by mass."

[1] Centrifugally Cast Composite Roll (A) Outer Layer

The outer layer is made of an Fe-based alloy comprising by mass 1.3-3.7% of C, 0.3-3% of Si, 0.1-3% of Mn, 1-7% of Cr, 1-8% of Mo, at least one element selected from the group consisting of 2.5-7% of V, 0.1-3% of Nb and 0.1-5% of W, V being indispensable, and 0.01-0.2% of B and/or 0.05-0.3% of S, the balance being substantially Fe and inevitable impurities. The outer layer may further contain at least one selected from the group consisting of 0.1-5% of Ni, 0.1-10% of Co, 0.01-0.5% of Zr, 0.005-0.5% of Ti, and 0.001-0.5% of Al.

(1) Indispensable Elements (a) C: 1.3-3.7% by Mass

C is combined with V, Nb, Cr, Mo and W to form hard carbides, contributing to improving the wear resistance of the outer layer. When C is less than 1.3% by mass, the precipitation of hard carbides is too small to impart sufficient wear resistance to the outer layer. On the other hand, when C exceeds 3.7% by mass, excessive amounts of carbides are precipitated, providing the outer layer with low toughness and thus low cracking resistance. As a result, the roll suffers deep cracks and large loss by rolling. The lower limit of the C content is preferably 1.5% by mass. The upper limit of the C content is preferably 3.4% by mass, more preferably 3% by mass.

(b) Si: 0.3-3% by Mass

Si deoxidizes the melt to reduce oxide defects, is dissolved in the matrix to improve seizure resistance, and improves the fluidity of the melt to prevent casting defects. Less than 0.3% by mass of Si has an insufficient effect of deoxidizing the melt, and provides the melt with insufficient fluidity, resulting in a higher percentage of defects. On the other hand, when Si exceeds 3% by mass, the alloy matrix becomes brittle, providing the outer layer with low toughness. The lower limit of the Si content is preferably 0.4% by mass, more preferably 0.5% by mass. The upper limit of the Si content is preferably 2.7% by mass, more preferably 2.5% by mass.

(c) Mn: 0.1-3% by Mass

Mn has a function to deoxidize the melt, and fixes S, an impurity, as MnS. Because MnS having a lubricating function is effective to prevent the seizure of a strip being rolled, it is preferable to contain a desired amount of MnS. Less than 0.1% by mass of Mn does not have sufficient effects. On the other hand, even though Mn exceeds 3% by mass, further effects cannot be obtained. The lower limit of the Mn content is preferably 0.3% by mass. The upper limit of the Mn content is preferably 2.4% by mass, more preferably 1.8% by mass.

(d) Cr: 1-7% by Mass

Cr is an effective element for providing a bainite or martensite matrix to have high hardness, thereby keeping wear resistance. When Cr is less than 1% by mass, an insufficient amount of Cr is dissolved in the inner layer, providing an insufficient effect of improving the wear loss resistance of the clutch portion. On the other hand, more than 7% by mass of Cr decreases the toughness of the matrix. The lower limit of the Cr content is preferably 1.5% by mass, more preferably 2.5% by mass. The upper limit of the Cr content is preferably 6.8% by mass.

(e) Mo: 1-8% by Mass

Mo is combined with C to form hard carbide ($M_6C$, $M_2C$), increasing the hardness of the outer layer, and improving the hardenability of the matrix. Mo also forms tough and hard MC carbide together with V and Nb, improving wear resistance. When Mo is less than 1% by mass, an insufficient amount of Mo is dissolved in the inner layer, providing an insufficient effect of improving the wear loss resistance of the clutch portion. On the other hand, when Mo is more than 8% by mass, the outer layer has low toughness. The lower limit of the Mo content is preferably 1.5% by mass, more preferably 2.5% by mass. The upper limit of the Mo content is preferably 7.8% by mass, more preferably 7.6% by mass.

(f) Carbide-forming Elements

The outer layer comprises as a carbide-forming element at least one selected from the group consisting of 2.5-7% by mass of V, 0.1-3% by mass of Nb and 0.1-5% by mass of W, V being an indispensable element.

(i) V: 2.5-7% by Mass

V is an element combined with C to form hard MC carbide. MC carbide having Vickers hardness Hv of 2500-3000 is hardest among carbides. When V is less than 2.5% by mass, a sufficient amount of MC carbide is not precipitated, and an insufficient amount of V is dissolved in the inner layer, resulting in an insufficient effect of improving the wear loss resistance of the clutch portion. On the other hand, when V is more than 7% by mass, MC carbide having a low specific gravity is concentrated in the outer layer on the inner surface side by a centrifugal force during centrifugal casting, likely providing a large segregation of MC carbide in a radial direction, making larger MC carbide to provide a coarser alloy structure, and causing surface roughening during rolling. The lower limit of the V content is preferably 2.7% by mass, more preferably 2.9% by mass. The upper limit of the V content is preferably 6.9% by mass, more preferably 6.8% by mass.

(ii) Nb: 0.1-3% by Mass

Like V, Nb is also combined with C to form hard MC carbide. Nb is dissolved in MC carbide together with V and Mo, to strengthen the MC carbide, thereby improving the wear resistance of the outer layer. Because the density difference is smaller between NbC (MC carbide) and the melt than between VC (MC carbide) and the melt, the segregation of MC carbide is reduced. The lower limit of the Nb content is preferably 0.2% by mass. The upper limit of the Nb content is preferably 2.9% by mass, more preferably 2.8% by mass.

(iii) W: 0.1-5% by Mass

W is combined with C to form hard carbides such as $M_6C$, etc., contributing to improvement in the wear resistance of the outer layer. It is also dissolved in MC carbide to increase its specific gravity, reducing segregation. However, more than 5% by mass of W increases $M_6C$ carbide, making the structure non-uniform, and thus causing surface roughening. Accordingly, W is 5% or less by mass, if added. On the other hand, when W is less than 0.1% by mass, sufficient effects are not obtained. The upper limit of the W content is preferably 4% by mass, more preferably 3% by mass.

(g) B and/or S

The outer layer further contains 0.01-0.2% by mass of B and/or 0.05-0.3% by mass of S. These elements improve the seizure resistance of the outer layer. In hot rolling, a rolling trouble called "overlapped rolling," in which folded steel strips are rolled in an overlapped state, is likely to occur, so that high-temperature steel strips cause seizure and heat cracking on the roll surface. B and S form compounds having a lubricating function in the outer layer, improving seizure resistance.

(i) B: 0.01-0.2% by Mass

B is dissolved in carbides, and forms carboboride having a lubricating function, thereby improving seizure resistance. Because carboboride remarkably exhibits a lubricating function particularly at high temperatures, it is effective to prevent seizure when a hot-rolled strip is folded and bitten by the roll. When B is less than 0.01% by mass, a sufficient lubricating function cannot be obtained. On the other hand, when B exceeds 0.2% by mass, the outer layer becomes brittle. The lower limit of the B content is preferably 0.012% by mass, more preferably 0.015% by mass. The upper limit of the B content is preferably 0.15% by mass, more preferably 0.1% by mass.

(ii) S: 0.05-0.3% by Mass

Though S is usually treated as a harmful element, it is added to utilize the lubricating function of MnS. When S is less than 0.05% by mass, a sufficient lubricating function of MnS cannot be obtained. On the other hand, when S exceeds 0.3% by mass, the outer layer becomes brittle. The upper limit of the S content is preferably 0.2% by mass, more preferably 0.15% by mass.

(2) Optional Elements

The outer layer may further contain at least one selected from the group consisting of 0.1-5% of Ni, 0.1-10% of Co, 0.01-0.5% of Zr, 0.005-0.5% of Ti, and 0.001-0.5% of Al by mass.

(a) Ni: 0.1-5% by Mass

Ni has a function to improve the hardenability of the matrix. Accordingly, Ni added to a large composite roll can prevent pearlite from generating during cooling, thereby improving the hardness of the outer layer. Less than 0.1% by mass of Ni provides substantially no effects, and more than 5% by mass of Ni makes austenite too stable, making it difficult to improve the hardness. The upper limit of the Ni content is preferably 4% by mass, more preferably 3.5% by mass.

(b) Co: 0.1-10% by Mass

Co is an element dissolved in the matrix to strengthen the matrix at high temperatures, effectively improving wear resistance and surface roughening resistance. Less than 0.1% by mass of Co provides substantially no effects, and more than 10% by mass of Co does not provide further improvement. The lower limit of the Co content is preferably 1% by mass. The upper limit of the Co content is preferably 7% by mass.

(c) Zr: 0.01-0.5% by Mass

Like V and Nb, Zr is combined with C to form MC carbide, improving wear resistance. Zr also forms oxide in the melt, and this oxide functions as crystal nuclei for making the solidified structure finer. Further, Zr increases the specific gravity of MC carbide, effectively preventing segregation. However, when Zr exceeds 0.5% by mass, inclusions are undesirably formed. The upper limit of the Zr content is more preferably 0.3% by mass. To obtain sufficient effects, the lower limit of the Zr content is more preferably 0.02% by mass.

(d) Ti: 0.005-0.5% by Mass

Ti is combined with C and N to form hard granular compounds such as TiC, TiN and TiCN, which act as nuclei for MC carbide, making MC carbide finer and more uniform, contributing to improvement in wear resistance and surface roughening resistance. However, when Ti exceeds 0.5% by mass, the viscosity of the melt increases, resulting in more casting defects. The upper limit of the Ti content is more preferably 0.3% by mass, most preferably 0.2% by mass. To obtain sufficient effects, the lower limit of the Ti content is more preferably 0.01% by mass.

(e) Al: 0.001-0.5% by Mass

Al having high affinity for oxygen acts as a deoxidizing agent. Al is also combined with N and O, graphitization-preventing elements, to form oxynitride, which is dispersed as nuclei in the melt, resulting in the uniform precipitation of fine MC carbide. However, when Al exceeds 0.5% by mass, the outer layer becomes brittle. When Al is less than 0.001% by mass, sufficient effects cannot be obtained. The upper limit of the Al content is more preferably 0.3% by mass, most preferably 0.2% by mass. To obtain sufficient effects, the lower limit of the Al content is more preferably 0.01% by mass.

(3) Inevitable Impurities

The balance of the composition of the outer layer is substantially composed of Fe and inevitable impurities. Among the inevitable impurities, the amount of P is preferably as small as possible because P deteriorates mechanical properties. Specifically, the P content is preferably 0.1% or less by mass. As other inevitable impurities, the total amount of elements such as Cu, Sb, Te, Ce, etc. may be 0.7% or less by mass.

(4) Structure

The structure of the outer layer comprises (a) MC carbide, (b) carbide mainly comprising Mo (Mo-based carbide) such as $M_2C$ and $M_6C$, or carbide mainly comprising (Cr-based carbide) such as $M_7C_3$ and $M_{23}C_6$, (c) carboboride, and (d) a matrix. The carboboride generally has a composition of M(C, B). The metal M is mainly at least one of Fe, Cr, Mo, V, Nb and W, and the percentages of the metal M, C and B are variable depending on the composition. The structure of the outer layer of the present invention does not contain graphite.

(B) Inner Layer (1) Carbide-forming Elements

The inner layer 2 integrally fused to the outer layer 1, which is made of ductile cast iron, comprises a core portion 21 fused to the outer layer 1, and a drive-side shaft portion 22 and a free-side shaft portion 23 integrally extending from both ends of the core portion 21. The inner layer 2 is characterized in that (a) the total amount of carbide-forming elements (Cr, Mo, V, Nb and W) in an end portion of the drive-side shaft portion 22 is 0.35-2% by mass, that (b) the total amount of carbide-forming elements (Cr, Mo, V, Nb and W) in an end portion of the free-side shaft portion 23 is 0.15-1.8% by mass, and that (c) the total amount of Cr, Mo, V, Nb and W at the drive-side shaft portion 22 is more than the total amount of Cr, Mo, V, Nb and W at the free-side shaft portion 23 by 0.2% or more by mass.

Requirements (a) and (b)

When the outer layer 1 contains 1-7% of Cr, 1-8% of Mo and 2.5-7% of V, and optionally 0.1-3% of Nb and 0.1-5% of W, part of Cr, Mo, V, Nb and W move from the outer layer 1 to the inner layer 2 when the inner layer 2 is formed, resulting in increased concentrations of Cr, Mo, V, Nb and W in the drive-side shaft portion 22 and free-side shaft portion 23 of the inner layer 2. In the centrifugally cast composite roll obtained by the method of the present invention, the total amount of carbide-forming elements (Cr, Mo, V, Nb and W) is 0.35-2% by mass in an end portion of the drive-side shaft portion 22, and 0.15-1.8% by mass in an end portion of the free-side shaft portion 23 in the inner layer 2. Strength and hardness are increased in both shaft portions of the roll by the solid solution strengthening of the matrix and the formation of carbides.

When the total amount of Cr, Mo, V, Nb and W in an end portion of the drive-side shaft portion 22 is less than 0.35% by mass, the drive-side shaft portion 22 is not provided with sufficiently high strength and hardness, and particularly the clutch portion 24 has insufficient wear loss resistance. On the other hand, when the total amount of Cr, Mo, V, Nb and W exceeds 2% by mass, carbides are excessively formed, so that the drive-side shaft portion 22 may be broken. The total amount of Cr, Mo, V, Nb and W in an end portion of the drive-side shaft portion 22 is preferably 0.6-1.8% by mass.

When the total amount of Cr, Mo, V, Nb and W in an end portion of the free-side shaft portion 23 is less than 0.15% by mass, the free-side shaft portion 23 is not sufficiently strengthened. On the other hand, when the total amount of Cr, Mo, V, Nb and W exceeds 1.8% by mass, carbides are excessively formed, resulting in too low machinability. The total amount of Cr, Mo, V, Nb and W in an end portion of the free-side shaft portion 23 is preferably 0.2-1.5% by mass.

The total amount of Cr, Mo, V, Nb and W is determined by chemically analyzing samples taken from a range within 100 mm from axial end surfaces of the drive-side shaft portion 22 and the free-side shaft portion 23. When the total amount of Cr, Mo, V, Nb and W meets the above condition in a range within 100 mm from an axial end surface of the drive-side shaft portion 22, the clutch portion 24 may be regarded as having necessary wear loss resistance. When the total amount of Cr, Mo, V, Nb and W meets the above condition in a range within 100 mm from an axial end surface of the free-side shaft portion 23, the entire free-side shaft portion 23 may be regarded as having sufficient machinability.

Requirement (c)

The total amount of Cr, Mo, V, Nb and W in an end portion of the drive-side shaft portion 22 is larger than the total amount of Cr, Mo, V, Nb and W in an end portion of the free-side shaft portion 23 by 0.2% or more by mass. This further increases the wear loss resistance of the clutch portion 24 of the drive-side shaft portion 22, and secures the machinability of the free-side shaft portion 23. Difference in the total amount of Cr, Mo, V, Nb and W between the end portions of both shaft portions 22, 23 is preferably 0.25% or more by mass, more preferably 0.3% or more by mass.

(2) Composition of Inner Layer

Ductile cast iron used for forming the inner layer 2 preferably comprises by mass 2.3-3.6% of C, 1.5-3.5% of Si, 0.2-2% of Mn, 0.05-1% of Cr, 0.05-1% of Mo, 0.05-1% of V, 0-0.7% of Nb, 0-0.7% of W, 0.3-2.5% of Ni, and 0.01-0.08% of Mg, the balance being substantially Fe and inevitable impurities. Of course, the total amount of Cr, Mo, V, Nb and W should meet the above requirements (a) and (b). The inner layer 2 may further contain 0.1% or less of Al and 0.1-1% of Cu. The total amount of B, Ca, Na or Zr migrated from a flux or a refractory material is preferably 0.2% or less. It may also contain about 0.1% or less in total of S, P, N and O as impurities.

[2] Production Method of Composite Roll

Figure 3A:
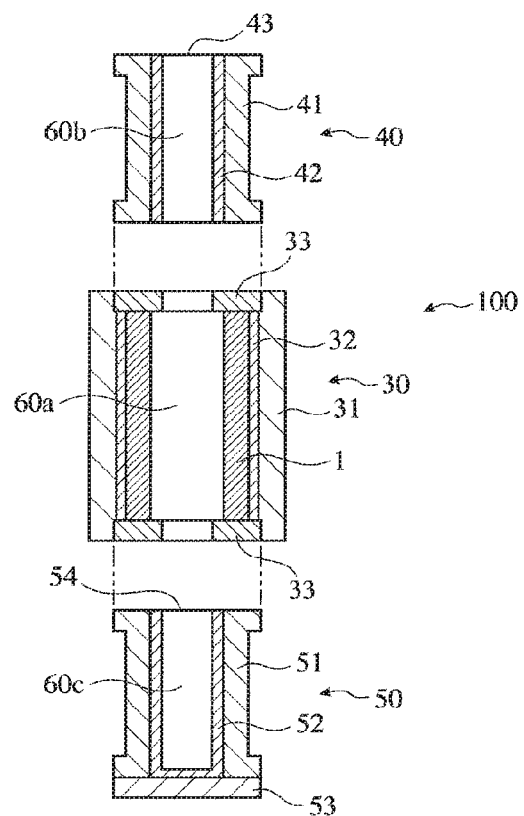
FIG. 3(a) is an exploded cross-sectional view showing an example of casting molds used for producing the centrifugally cast composite roll of the present invention.
Figure 3B:
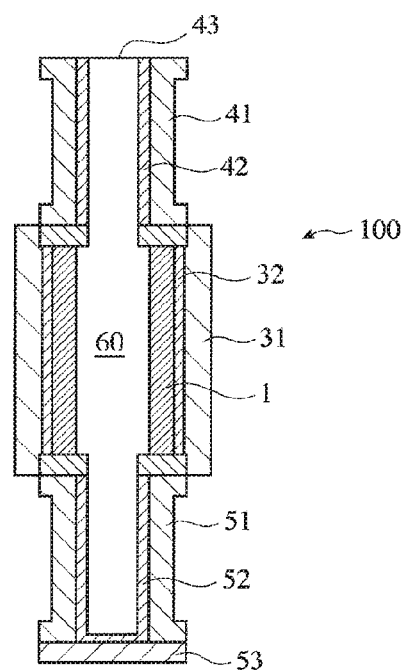
FIG. 3(b) is a cross-sectional view showing an example of casting molds used for producing the centrifugally cast composite roll of the present invention.

FIGS. 3(a) and 3(b) show an example of stationary casting molds used for casting an inner layer 2 after an outer layer 1 is centrifugally cast in a cylindrical centrifugal casting mold 30. A stationary casting mold 100 comprises the cylindrical casting mold 30 having an inner surface on which the outer layer 1 is formed, and an upper mold 40 and a lower mold 50 attached to upper and lower ends of the cylindrical casting mold 30. An inner surface of the outer layer 1 in the cylindrical casting mold 30 constitutes a cavity 60a for forming a core portion 21 of the inner layer 2, the upper mold 40 has a cavity 60b for forming a free-side shaft portion 23 of the inner layer 2, and the lower mold 50 has a cavity 60c for forming a drive-side shaft portion 22 of the inner layer 2. A centrifugal casting method using the cylindrical casting mold 30 may be a horizontal, inclined or vertical type.

With the upper mold 40 and the lower mold 50 assembled to upper and lower ends of the cylindrical casting mold 30, the cavity 60a in the outer layer 1 communicates with the cavity 60b of the upper mold 40 and the cavity 60c of the lower mold 50, thereby forming a cavity 60 for integrally forming the entire inner layer 2. 32 and 33 in the cylindrical casting mold 30 represent sand molds. Also, 42 in the upper mold 40 and 52 in the lower mold 50 represent sand molds. The lower mold 50 is provided with a bottom plate 53 for holding a melt for the inner layer.

As shown in FIGS. 3(a) and 3(b), the cylindrical mold 30 with the centrifugally cast outer layer 1 is vertically placed on the lower mold 50 for forming the drive-side shaft portion 22, and the upper mold 40 for forming the free-side shaft portion 23 is placed on the cylindrical mold 30, thereby constituting the stationary casting mold 100 for forming the inner layer 2.

In the stationary casting mold 100, as a ductile cast iron melt for the inner layer 2 is poured into the cavity 60 through an upper opening 43 of the upper mold 40 during or after solidifying the outer layer formed by a centrifugal casting method, a surface of the melt in the cavity 60 is gradually elevated from the lower mold 50 to the upper mold 40, integrally forming the inner layer 2 constituted by the drive-side shaft portion 22, the core portion 21 and the free-side shaft portion 23. In this process, an inner portion of the outer layer 1 is melted again by heat of the melt, so that Cr, Mo, V, Nb and W in the outer layer 1 are mixed or migrated into the inner layer 2.

In the method of the present invention, the elevating speed of a melt surface in the upper mold 40 for forming the free-side shaft portion 23 is 100 mm/second or less, which is smaller than the elevating speed of a melt surface in the lower mold 50 for forming the drive-side shaft portion 22 and the cylindrical casting mold 30 (outer layer 1) for forming the core portion 21. With this condition, Cr, Mo, V, Nb and W coming from the outer layer 1 remolten by pouring a melt up to the core portion 21 remain in the drive-side shaft portion 22 and the core portion 21 to some extent, so that they are suppressed from being mixed into the free-side shaft portion 23 formed in the upper mold 40.

When the elevating speed of a melt surface in the upper mold 40 exceeds 100 mm/second, a melt in the lower mold 50 and the cylindrical casting mold 30 is mixed with a melt in the upper mold 40 by stirring caused by pouring, so that Cr, Mo, V, Nb and W in the drive-side shaft portion 22 and the core portion 21 are mixed into the free-side shaft portion 23. As a result, the free-side shaft portion 23 has too large a total amount of Cr, Mo, V, Nb and W, so that it becomes too hard. The elevating speed of a melt surface in the upper mold 40 is preferably 10-100 mm/second, more preferably 20-90 mm/second.

With the elevating speed of a melt surface in the upper mold 40 being 100 mm/second or less, and smaller than the elevating speed of a melt surface in the lower mold 50 and the elevating speed of a melt surface in the cylindrical casting mold 30 (outer layer 1), Cr, Mo, V, Nb and W in the outer layer 1 can efficiently be mixed into the drive-side shaft portion 22 and the core portion 21, and Cr, Mo, V, Nb and W mixed into the drive-side shaft portion 22 and the core portion 21 are effectively suppressed from excessively reentering the free-side shaft portion 23 by stirring of the melt. The elevating speed of a melt surface in the upper mold 40 is preferably smaller than the elevating speed of a melt surface in the lower mold 50 and the elevating speed of a melt surface in the cylindrical casting mold 30 (outer layer 1) by 50-150 mm/second. Though not restrictive as long as pouring is not hindered, the elevating speed of a melt surface in the lower mold 50 and the elevating speed of a melt surface in the cylindrical casting mold 30 (outer layer 1) are preferably 100-200 mm/second in practice. The elevating speed of a melt surface in the lower mold 50 may be the same as or larger than that in the cylindrical casting mold 30 (outer layer 1). Incidentally, any of the elevating speed of a melt surface in the upper mold 40, the elevating speed of a melt surface in the lower mold 50, and the elevating speed of a melt surface in the cylindrical casting mold 30 (outer layer 1) is an average elevating speed.

As described above, not only by adjusting the amounts of Cr, Mo, V, Nb and W in the outer layer 1, but also by adjusting the elevating speed of a melt surface in the upper mold 40, the elevating speed of a melt surface in the lower mold 50, and the elevating speed of a melt surface in the cylindrical casting mold 30 (outer layer 1), the amounts of Cr, Mo, V, Nb and W mixed into the drive-side shaft portion 22 and the free-side shaft portion 23 can be controlled. Specifically, the total amount of Cr, Mo, V, Nb and W in an end portion of the drive-side shaft portion 22 formed in the lower mold 50 having a large elevating speed of a melt surface is larger than the total amount of Cr, Mo, V, Nb and W in an end portion of the free-side shaft portion 23 formed in the upper mold 40 by 0.2% or more by mass. Accordingly, the clutch portion 24 in an end portion of the drive-side shaft portion 22 can have high wear loss resistance. On the other hand, the free-side shaft portion 23 having a small total amount of Cr, Mo, V, Nb and W is more easily machined than the drive-side shaft portion 22.

Figure 4:
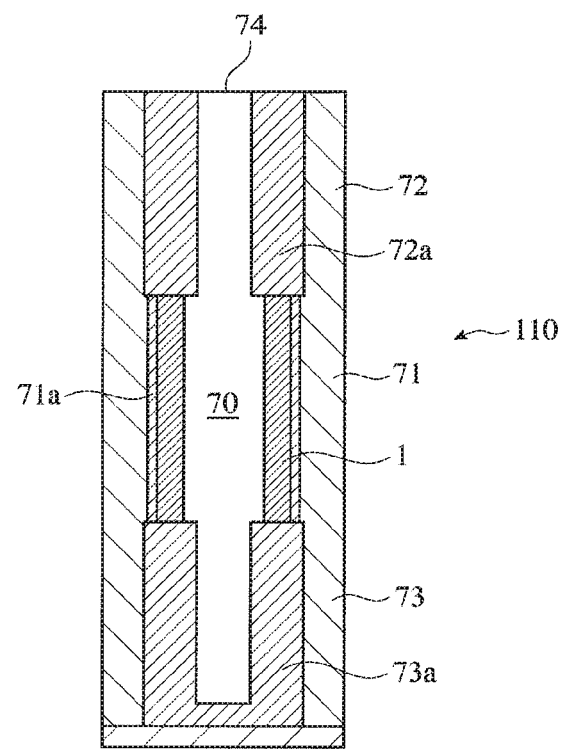
FIG. 4 is a cross-sectional view showing another example of casting molds used for producing the centrifugally cast composite roll of the present invention.

FIG. 4 shows another example of casting molds used in the method of the present invention. This casting mold 110 integrally has a portion 71 corresponding to the cylindrical casting mold 30 for forming the outer layer 1 and the core portion 21, a portion 72 corresponding to the upper mold 40 for forming the free-side shaft portion 23, and a portion 73 corresponding to the lower mold 50 for forming the drive-side shaft portion 22. Incidentally, 71a, 72a, 73a represent sand molds. Thus, the casting mold 110 functions not only as a centrifugal casting mold but also as a stationary casting mold. After centrifugally casting the outer layer 1 by the casting mold 110, the entire casting mold 110 having the outer layer 1 on the inner surface is erected, and a ductile cast iron melt for the inner layer 2 is poured through an upper opening 74.

When an intermediate layer is formed to suppress the mixing of components, to form a buffer layer, and so on, the intermediate layer is formed on an inner surface of the outer layer 1, and the cylindrical casting mold 30 is then erected in the case of the casting mold shown in FIG. 3, or the casting mold 110 is erected in the case of the casting mold shown in FIG. 4, and finally a ductile cast iron melt for the inner layer 2 is poured through the upper opening. When a melt for the intermediate layer is poured, an inner surface of the outer layer 1 is melted again, and Cr, Mo, V, Nb and W are mixed into the intermediate layer. Because an inner surface of the intermediate layer is melted again when the inner layer 2 is cast, Cr, Mo, V, Nb and W are also mixed into the inner layer.

The present invention will be explained in more detail by Examples below without intention of restricting the scope of this invention.

EXAMPLES 1-3, AND COMPARATIVE EXAMPLES 1 AND 2

With a cylindrical casting mold 30 (inner diameter: 800 mm, and length: 2500 mm) having the structure shown in FIG. 3(*a*) set in a horizontal centrifugal casting machine, each melt having a composition (balance: Fe and inevitable impurities) shown in Table 1 was centrifugally cast to form an outer layer 1. After the solidification of the outer layer 1, the cylindrical casting mold 30 having the outer layer 1 (thickness: 90 mm) formed on its inner surface was erected and placed on a hollow lower mold 50 (inner diameter: 600 mm, and length: 1500 mm) for forming a drive-side shaft portion 22, and a hollow upper mold 40 (inner diameter: 600 mm, and length: 2000 mm) for forming a free-side shaft portion 23 was vertically placed on the cylindrical casting mold 30, thereby constituting a stationary casting mold 100 shown in FIG. 3(*b*).

A ductile cast iron melt having a chemical composition (balance: Fe and inevitable impurities) shown in Table 1 was poured into a cavity 60 of the stationary casting mold 100 through its upper opening 43. A surface of the ductile cast iron melt was elevated from the lower mold 50 for forming the drive-side shaft portion 22, to the cylindrical casting mold 30 (outer layer 1) for forming the core portion 21, and to the upper mold 40 for forming the free-side shaft portion 23 successively in this order. Thus, an integral inner layer 2 constituted by the drive-side shaft portion 22, the core portion 21 and the free-side shaft portion 23 was formed in the outer layer 1.

After the inner layer 2 was completely solidified, the stationary casting mold 100 was disassembled to take out a composite roll, which was tempered at 500° C. The outer layer 1, drive-side shaft portion 22 and free-side shaft portion 23 of the composite roll were then machined to predetermined shapes, to form a clutch portion 24 and a projection 25. Ultrasonic inspection confirmed that the outer layer 1 and the inner layer 2 were well fused to each other in each composite roll thus obtained.

EXAMPLE 4

A composite roll was formed in the same manner as in Example 1, except that the cylindrical casting mold 30 was erected after an intermediate layer (thickness: 20 mm) having a composition (balance: Fe and inevitable impurities) shown in Table 1 was formed on an inner surface of the outer layer 1. Ultrasonic inspection confirmed that the outer layer 1, the intermediate layer and the inner layer 2 were well fused to each other.

TABLE 1

| No. | Layer | Chemical Composition (% by mass)[1] | | | | | |
|---|---|---|---|---|---|---|---|
| | | C | Si | Mn | Cr | Ni | Mo |
| Example 1 | Outer Layer | 2.59 | 1.28 | 1.02 | 5.00 | — | 4.32 |
| | Inner Layer | 3.30 | 2.60 | 0.43 | 0.11 | 1.10 | 0.12 |
| Example 2 | Outer Layer | 1.72 | 1.82 | 0.91 | 4.54 | 1.91 | 4.26 |
| | Inner Layer | 3.31 | 2.44 | 0.50 | 0.15 | 1.41 | 0.12 |
| Example 3 | Outer Layer | 2.38 | 0.68 | 0.41 | 6.91 | 0.84 | 3.78 |
| | Inner Layer | 3.27 | 2.75 | 0.48 | 0.16 | 1.32 | 0.11 |
| Example 4 | Outer Layer | 2.69 | 1.35 | 0.82 | 3.88 | 2.99 | 3.79 |
| | Intermediate[2] | 2.70 | 1.34 | 0.67 | 0.35 | 2.11 | 1.52 |
| | Inner Layer | 3.35 | 2.65 | 0.40 | 0.15 | 1.01 | 0.07 |
| Com. Ex. 1 | Outer Layer | 1.57 | 0.92 | 0.85 | 4.21 | — | 5.43 |
| | Inner Layer | 3.38 | 2.64 | 0.59 | 0.15 | 1.29 | 0.07 |
| Com. Ex. 2 | Outer Layer | 2.54 | 2.05 | 0.80 | 5.22 | 1.46 | 4.11 |
| | Inner Layer | 3.31 | 2.65 | 0.45 | 0.08 | 1.37 | 0.09 |

| No. | Layer | Chemical Composition (% by mass)[1] | | | | |
|---|---|---|---|---|---|---|
| | | V | Nb | W | B | S |
| Example 1 | Outer Layer | 4.01 | — | — | 0.059 | — |
| | Inner Layer | 0.05 | — | — | — | — |
| Example 2 | Outer Layer | 4.47 | 0.62 | — | 0.057 | — |
| | Inner Layer | 0.08 | — | — | — | — |
| Example 3 | Outer Layer | 3.78 | 0.11 | 1.31 | 0.099 | 0.1 |
| | Inner Layer | 0.11 | — | — | — | — |
| Example 4 | Outer Layer | 3.71 | 1.04 | 0.46 | 0.058 | 0.15 |
| | Intermediate[2] | 0.20 | — | — | — | — |
| | Inner Layer | 0.06 | — | — | — | — |
| Com. Ex. 1 | Outer Layer | 4.67 | — | — | 0.007 | — |
| | Inner Layer | 0.16 | — | — | — | — |
| Com. Ex. 2 | Outer Layer | 3.03 | 0.74 | 1.19 | — | 0.1 |
| | Inner Layer | 0.08 | — | — | — | — |

Note:
[1]The balance is composed of Fe and inevitable impurities in each chemical composition.
[2]Intermediate layer.

In Examples 1-4, and Comparative Examples 1 and 2, the pouring (casting) temperatures of the outer layer, the inner layer and the intermediate layer, and an average elevating speed of a surface of an inner layer melt in the lower mold 50 for forming the drive-side shaft portion 22, in the cylindrical casting mold 30 for forming the core portion 21, and in the upper mold 40 for forming the free-side shaft portion 23 are shown in Table 2. The average elevating speed of a melt surface for the inner layer was calculated from the weight change of the inner layer melt and the casting time. The amounts of Cr, Mo, V, Nb and W were analyzed on each sample cut out of an end surface 24a of the drive-side shaft portion 22 and an end surface 25a of the free-side shaft portion 23. The results are shown in Table 3. Metal structure observation confirmed that the outer layers of Examples 1-4 did not contain graphite.

TABLE 2

| No. | Layer | Casting Temperature (° C.) | Average Elevating Speed of Melt Surface (mm/second) | | |
|---|---|---|---|---|---|
| | | | Lower Mold | Core Portion | Upper Mold |
| Example 1 | Outer Layer | 1349 | — | — | — |
| | Inner Layer | 1430 | 200 | 195 | 40 |
| Example 2 | Outer Layer | 1404 | — | — | — |
| | Inner Layer | 1415 | 180 | 175 | 50 |
| Example 3 | Outer Layer | 1385 | — | — | — |
| | Inner Layer | 1447 | 180 | 175 | 50 |
| Example 4 | Outer Layer | 1338 | — | — | — |
| | Intermediate Layer | 1411 | — | — | — |
| | Inner Layer | 1425 | 180 | 175 | 50 |
| Com. Ex. 1 | Outer Layer | 1421 | — | — | — |
| | Inner Layer | 1418 | 200 | 170 | 130 |
| Com. Ex. 2 | Outer Layer | 1343 | — | — | — |
| | Inner Layer | 1432 | 190 | 190 | 150 |

TABLE 3

| No. | Shaft Portion | Chemical Composition (% by mass)[1] | | | | | |
|---|---|---|---|---|---|---|---|
| | | Cr | Mo | V | Nb | W | Total[3] |
| Example 1 | Upper Mold | 0.12 | 0.17 | 0.13 | — | — | 0.42 |
| | Lower Mold | 0.19 | 0.41 | 0.37 | — | — | 0.97 |
| | Difference[2] | 0.07 | 0.24 | 0.24 | — | — | 0.55 |
| Example 2 | Upper Mold | 0.20 | 0.17 | 0.14 | 0.02 | — | 0.53 |
| | Lower Mold | 0.39 | 0.34 | 0.37 | 0.08 | — | 1.18 |
| | Difference | 0.19 | 0.17 | 0.23 | 0.06 | — | 0.65 |
| Example 3 | Upper Mold | 0.37 | 0.32 | 0.44 | 0.03 | 0.04 | 1.20 |
| | Lower Mold | 0.45 | 0.42 | 0.59 | 0.04 | 0.06 | 1.56 |
| | Difference | 0.08 | 0.10 | 0.15 | 0.01 | 0.02 | 0.36 |
| Example 4 | Upper Mold | 0.15 | 0.13 | 0.10 | 0.01 | — | 0.39 |
| | Lower Mold | 0.19 | 0.35 | 0.28 | 0.02 | — | 0.84 |
| | Difference | 0.04 | 0.22 | 0.18 | 0.01 | — | 0.45 |
| Com. Ex. 1 | Upper Mold | 0.31 | 0.29 | 0.40 | — | — | 1.00 |
| | Lower Mold | 0.35 | 0.34 | 0.46 | — | — | 1.15 |
| | Difference | 0.04 | 0.05 | 0.06 | — | — | 0.15 |
| Com. Ex. 2 | Upper Mold | 0.32 | 0.45 | 0.53 | 0.11 | 0.02 | 1.43 |
| | Lower Mold | 0.36 | 0.50 | 0.59 | 0.12 | 0.02 | 1.59 |
| | Difference | 0.04 | 0.05 | 0.06 | 0.01 | 0.00 | 0.16 |

Note:
[1]The balance is composed of Fe and inevitable impurities in each chemical composition.
[2]A value obtained by subtracting the analyzed value of the free-side shaft portion in the upper mold from the analyzed value of the drive-side shaft portion in the lower mold.
[3]The total amount of Cr, Mo, V, Nb and W.

In Examples 1-4, the elevating speed of a surface of a ductile cast iron melt for forming the free-side shaft portion 23 in the upper mold 40 was 100 mm/second or less, smaller than the elevating speed of a surface of a ductile cast iron melt for forming the drive-side shaft portion 22 in the lower mold 50, and the elevating speed of a surface of a ductile cast iron melt for forming the core portion 21 in the cylindrical casting mold 30 (outer layer 1). Accordingly, the total amount of Cr, Mo, V, Nb and W in an end portion of the drive-side shaft portion 22, and the total amount of Cr, Mo, V, Nb and W in an end portion of the free-side shaft portion 23 were both in a range of 0.15-2.0% by mass, and the former was larger than the latter by 0.2% or more by mass.

On the other hand, in Comparative Examples 1 and 2, the elevating speed of a surface of a ductile cast iron melt in the upper mold 40 was more than 100 mm/second, though it was smaller than the elevating speed of a surface of a ductile cast iron melt in the lower mold 50 and the elevating speed of a surface of a ductile cast iron melt in the cylindrical casting mold 30 (outer layer 1). Accordingly, though the total amount of Cr, Mo, V, Nb and W in an end portion of the drive-side shaft portion 22, and the total amount of Cr, Mo, V, Nb and W in an end portion of the free-side shaft portion 23 were both in a range of 0.15-2.0% by mass, their difference was less than 0.2% by mass.

The comparison of Example 2 and Comparative Example 1, which were close in the total amount of Cr, Mo, V, Nb and W in an end portion of the drive-side shaft portion 22, indicates that Example 2 was larger than Comparative Example 1 in the difference between the total amount of Cr, Mo, V, Nb and W in an end portion of the drive-side shaft portion 22 and the total amount of Cr, Mo, V, Nb and W in an end portion of the free-side shaft portion 23. Accordingly, though they had sufficient hardness in the clutch portion 24 of the drive-side shaft portion 22, the free-side shaft portion 23 of Example 2 had good machinability because the mixing of Cr, Mo, V, Nb and W was suppressed, while the free-side shaft portion 23 of Comparative Example 1 suffered a drastically long machining time because large amounts of Cr, Mo, V, Nb and W were mixed thereinto.

Likewise, the comparison of Example 3 and Comparative Example 2, which were close in the total amount of Cr, Mo, V, Nb and W in an end portion of the drive-side shaft portion 22, indicates that though they had sufficient hardness in the clutch portion 24 of the drive-side shaft portion 22, the free-side shaft portion 23 of Example 3 had good machinability, while the free-side shaft portion 23 of Comparative Example 2 was hard, needing a drastically long machining time.

Effect of the Invention

Because Cr, Mo, V, Nb and W in an outer layer are mixed more into a drive-side shaft portion having a clutch portion than into a free-side shaft portion in the centrifugally cast composite roll of the present invention, the drive-side shaft portion is sufficiently hard, having excellent wear loss resistance, while the free-side shaft portion is not too hard, easy to machine. Accordingly, the centrifugally cast composite roll of the present invention has a drastically elongated use life and good machinability. Because the centrifugally cast composite roll of the present invention having such feature can be obtained by controlling the elevating speed of a surface of an inner layer melt poured after forming the outer layer, its production method is efficient, contributing to drastic reduction of the production cost of the centrifugally cast composite roll.

DESCRIPTION OF REFERENCE NUMERALS

10: Centrifugally cast composite roll
1: Outer layer
2: Inner layer
21: Core portion
22: Drive-side shaft portion
23: Free-side shaft portion
24: Clutch portion of drive-side shaft portion 24a: End surface of clutch portion
24b: Notch surface of clutch portion
25: Projection of free-side shaft portion
25a: End surface of projection
100: Stationary casting mold
30: Cylindrical centrifugal casting mold
32, 33, 42, 52: Sand mold
40: Upper mold for stationary casting
50: Lower mold for stationary casting
60, 60a, 60b, 60c: Cavity

What is claimed is:

1. A centrifugally cast composite roll comprising an outer layer formed by a centrifugal casting method, and an inner layer made of ductile cast iron and integrally fused to said outer layer;
said outer layer being made of an Fe-based alloy comprising by mass 1.3-3.7% of C, 0.3-3% of Si, 0.1-3% of Mn, 1-7% of Cr, 1-8% of Mo, at least one element selected from the group consisting of 2.5-7% of V, 0.1-3% of Nb and 0.1-5% of W, V being indispensable, and 0.01-0.2% of B and/or 0.05-0.3% of S, the balance being substantially Fe and inevitable impurities, said outer layer having a structure containing no graphite;
said inner layer comprising a core portion fused to said outer layer, and a drive-side shaft portion and a free-side shaft portion integrally extending from both ends of said core portion; and
the total amount of Cr, Mo, V, Nb and W in an end portion of said drive-side shaft portion being 0.35-2% by mass, and the total amount of Cr, Mo, V, Nb and W in an end portion of said free-side shaft portion being 0.15-1.8% by mass, the former being larger than the latter by 0.2% or more by mass.

2. The centrifugally cast composite roll according to claim 1, wherein said outer layer further comprises at least one selected from the group consisting of 0.1-5% of Ni, 0.1-10% of Co, 0.01-0.5% of Zr, 0.005-0.5% of Ti, and 0.001-0.5% of Al by mass.

3. The centrifugally cast composite roll according to claim 1, wherein the outer layer comprises 0.01-0.2% of B and/or 0.1-0.3% of S.

4. A method for producing a centrifugally cast composite roll recited in claim 1, comprising the steps of
(1) centrifugally casting said outer layer in a rotating cylindrical centrifugal casting mold;
(2) erecting said cylindrical casting mold having said outer layer, and disposing a lower mold for said drive-side shaft portion and an upper mold for said free-side shaft portion both communicating with said outer layer, on upper and lower ends of said cylindrical casting mold, to constitute a stationary casting mold; and
(3) pouring a melt for said inner layer into a cavity constituted by said upper mold, said outer layer and said lower mold;
the elevating speed of a melt surface in said upper mold being 100 mm/second or less, and smaller than the elevating speed of a melt surface in said lower mold and said outer layer.

5. The method for producing a centrifugally cast composite roll according to claim 4, wherein the difference between the elevating speed of a melt surface in said upper mold and the elevating speed of a melt surface in said lower mold and said outer layer is 50-150 mm/second.

6. A method for producing a centrifugally cast composite roll recited in claim 2, comprising the steps of
(1) centrifugally casting said outer layer in a rotating cylindrical centrifugal casting mold;
(2) erecting said cylindrical casting mold having said outer layer, and disposing a lower mold for said drive-side shaft portion and an upper mold for said free-side shaft portion both communicating with said outer layer, on upper and lower ends of said cylindrical casting mold, to constitute a stationary casting mold; and
(3) pouring a melt for said inner layer into a cavity constituted by said upper mold, said outer layer and said lower mold;
the elevating speed of a melt surface in said upper mold being 100 mm/second or less, and smaller than the elevating speed of a melt surface in said lower mold and said outer layer.

7. The method for producing a centrifugally cast composite roll according to claim 6, wherein the difference between the elevating speed of a melt surface in said upper mold and the elevating speed of a melt surface in said lower mold and said outer layer is 50-150 mm/second.

* * * * *